(12) United States Patent
Takahashi et al.

(10) Patent No.: US 8,791,660 B2
(45) Date of Patent: Jul. 29, 2014

(54) MOTOR CONTROL CIRCUIT

(75) Inventors: Ryoichi Takahashi, Isesaki (JP);
Hiroshi Inoue, Oota (JP); Masatoshi Komada, Kyoto (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 977 days.

(21) Appl. No.: 12/570,449

(22) Filed: Sep. 30, 2009

(65) Prior Publication Data

US 2010/0090624 A1 Apr. 15, 2010

(30) Foreign Application Priority Data

Sep. 30, 2008 (JP) .................................. 2008-253401
Sep. 30, 2008 (JP) .................................. 2008-253403

(51) Int. Cl.
*H02P 1/04* (2006.01)
(52) U.S. Cl.
USPC .................. 318/400.09; 318/400.05; 318/34; 318/41

(58) Field of Classification Search
USPC ............................ 318/400.09, 400.05, 34, 41
See application file for complete search history.

(56) References Cited

U.S. PATENT DOCUMENTS

| 5,206,572 | A | * | 4/1993 | Farag et al. | ................... 318/778 |
| 5,448,442 | A | * | 9/1995 | Farag | .............................. 361/24 |
| 7,719,214 | B2 | * | 5/2010 | Leehey et al. | ................... 318/34 |

* cited by examiner

*Primary Examiner* — Erick Glass
(74) *Attorney, Agent, or Firm* — Rennie William Dover

(57) ABSTRACT

In some preferred embodiments, a motor control circuit 1 for controlling driving of a plurality of motors 3 and 4 includes a serial communication circuit configured to perform serial communication with an outside, a received data storage 15 configured to store data from the serial communication circuit, a motor mode setting holding circuit 16 configured to store motor mode settings which decide operations of the motors, and a detection circuit 24 configured to detect changes in driving pulse of the motor. Depending on the detected result of the detection circuit 24, the data stored in the received data storage 15 is transferred to the motor mode setting holding circuit 16.

7 Claims, 11 Drawing Sheets

MOTOR CONTROL CIRCUIT

This application claims priority under 35 U.S.C. §119 to Japanese Patent Application No. 2008-253401 filed on Sep. 30, 2008 and Japanese Patent Application No. 2008-253403 filed on Sep. 30, 2008, the entire disclosure of each of which is incorporated herein by reference in its entirety.

BACKGROUND OF THE INVENTION

1. Field of the Invention

The preferred embodiments of the present invention relate to a motor control circuit for controlling revolutions of motors from outside, and more specifically to, a motor control circuit for controlling revolutions of motors from outside using serial communication.

2. Description of the Related Art

The following description sets forth the inventors' knowledge of related art and problems therein and should not be construed as an admission of knowledge in the prior art.

Conventionally, in controlling a plurality of motors, it is required to prepare a plurality of drivers corresponding to the number of motors. Therefore, in order to control a plurality of motors, the same number of drivers as the number of motors is required. In recent years, an IC having a plurality of built-in driver functions has become available in the market.

As a structure having a plurality of built-in drivers, for example, Japanese Unexamined Laid-open Patent Publication No. 2007-306637 proposes a multichannel load driving apparatus for driving a plurality of motors.

In the aforementioned IC having a plurality of built-in drivers, however, the IC is merely equipped with a plurality of stand-alone driver ICs. Provided that a single stand-alone driver IC requires ten (10) control terminals except for the power terminal and the ground terminal, in a IC equipped with three (3) stand-alone driver ICs, a total of thirty (30) external terminals are required. Thus, the number of external terminals has not been totally rationalized yet. Motors are required be controlled in real time and that doubling of external control terminals is difficult, and therefore it was difficult to rationalize the external control terminals. For this reason, even if a plurality of drivers are incorporated in a single IC, sufficient advantage due to the rationalization cannot be enjoyed.

In the meantime, when controlling a driver IC from an external microcomputer using signal lines, there is a possibility that the control is performed during the large current changes of the motor. At that time, a large current flows through the motor at the moment of driving the motor, which may cause presence of noise on the ground line of the driver IC. If new setting value is set on the signal line by the microcomputer, the new setting value may be falsely set due to the influence of the noise. False operation due to such false setting may cause damage of the motor.

The description herein of advantages and disadvantages of various features, embodiments, methods, and apparatus disclosed in other publications is in no way intended to limit the present invention. For example, certain features of the preferred embodiments of the invention may be capable of overcoming certain disadvantages and/or providing certain advantages, such as, e.g., disadvantages and/or advantages discussed herein, while retaining some or all of the features, embodiments, methods, and apparatus disclosed therein.

SUMMARY

The preferred embodiments of the present invention have been developed in view of the above-mentioned and/or other problems in the related art. The preferred embodiments of the present invention can significantly improve upon existing methods and/or apparatuses.

Among other potential advantages, some embodiments can provide a motor control circuit capable of rationalizing control terminals of a motor driver.

Among other potential advantages, some embodiments can provide a motor control circuit capable of preventing occurrence of false operation of a motor due to noise.

According to a first aspect of the present invention, the present invention provides a motor control circuit for controlling driving of a plurality of motors. The motor control circuit includes a serial communication circuit configured to perform serial communication with an outside, a storage configured to store data from the serial communication circuit, a motor mode setting holding circuit configured to store motor mode settings which decide operations of the motors, and a detection circuit configured to detect changes in driving pulse of the motor. Depending on the detected results of the detection circuit, the data stored in the storage is transferred to the motor mode setting holding circuit.

In the aforementioned motor control circuit, it is preferable to further include a delay circuit for delaying the driving pulse of the motor, wherein, during the delayed period of time caused by the delay circuit, the data stored in the storage is transferred to the motor mode setting holding circuit so as to reflect the data in operation setting of the motor.

Furthermore, in the aforementioned motor control circuit, it is preferable to further include an address matching detection circuit, wherein the address matching detection circuit has a storage portion and a comparison portion, and the storage portion stores a unique address, and wherein the comparison portion compares the unique address with an address sent from the serial communication circuit, and allows communication through the serial communication circuit when the address sent from the serial communication circuit coincides with the unique address.

In the aforementioned motor control circuit, motor controlling can be performed with less number of terminals. The reduced number of terminals enables reduction in IC production cost and also enables reduction in size. Also, the labor for connecting circuit boards can be reduced greatly.

According to a second aspect of the present invention, the present invention provides a motor control circuit for controlling driving of a plurality of motors using serial communication which performs communication at two terminals of a clock terminal and a data terminal based on a setting value set via the serial communication. The control circuit includes an invalid period detection circuit configured to receive a control signal of a transistor which controls a current supplied to the motor and output an invalid period signal showing an invalid period of time, and a gate circuit configured to gate a clock signal applied to the gate circuit from the clock terminal during a period in which the invalid period signal shows the invalid period of time.

In the aforementioned motor control circuit, it is preferable to further include a clock oscillation circuit, wherein the clock oscillation circuit includes a logic circuit and a flip-flop, and wherein the logic circuit creates a gate clock signal in which a signal from the clock oscillation circuit is gated by the invalid period signal and the gate clock signal is applied to the flip-flop.

Furthermore, in the aforementioned motor control circuit, it is preferable that the gate circuit includes a plurality of flip-flops connected in series, and the clock signal is applied to a first stage data terminal of the plurality of flip-flops and the gate clock signal is applied to clock terminals of the plurality of flip-flops.

In the aforementioned motor control circuit, in controlling the motors from the outside, false operations of motors due to false setting values can be prevented.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Figure 1:
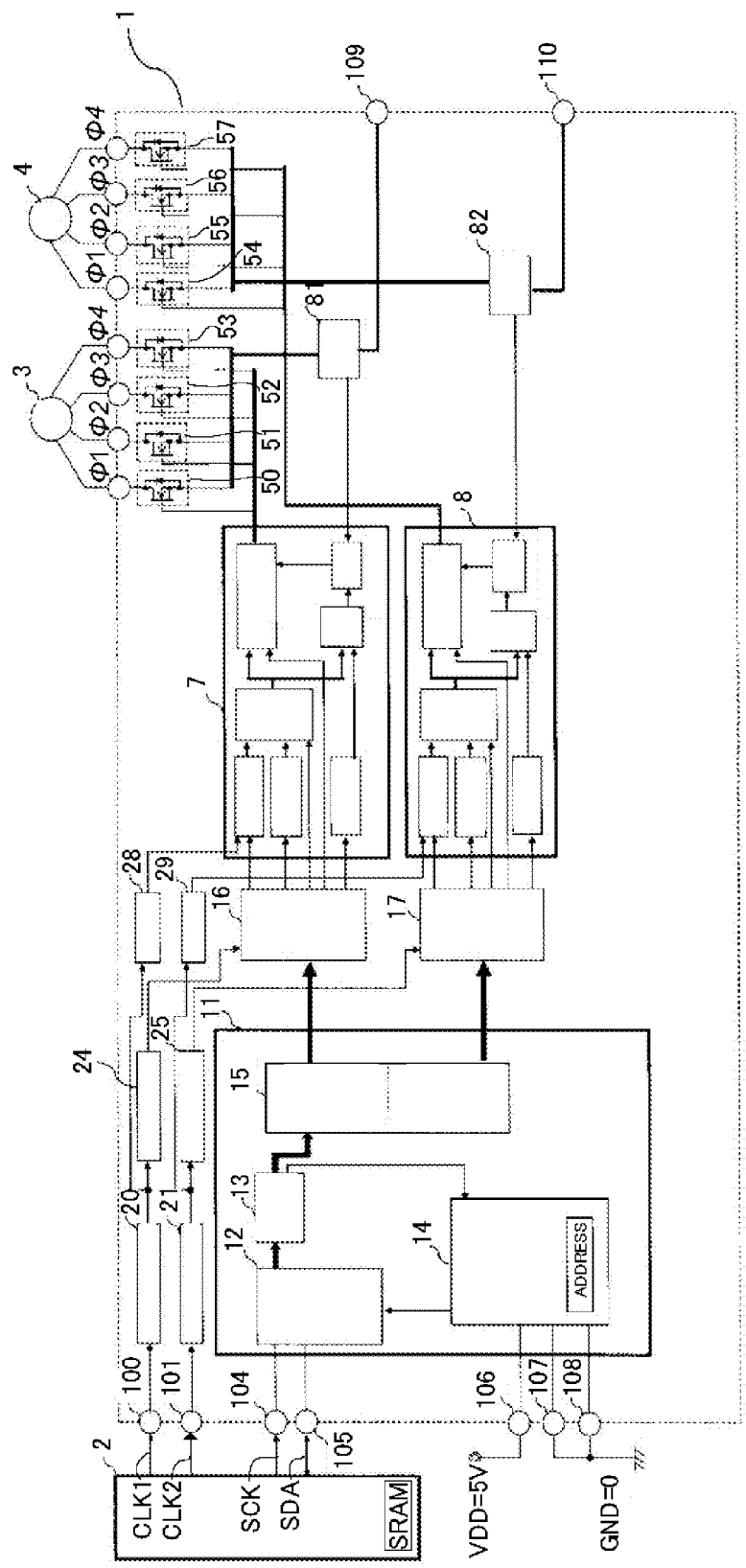
FIG. 1 is a block diagram showing a structure of a motor control circuit according to a first embodiment of the present invention.

FIG. 1 is a block diagram showing a motor control circuit 1 for controlling two motors, i.e., a first motor 3 and a second motor 4, according to a first embodiment of the present invention. The motor control circuit 1 is connected to a microcomputer 2 and controlled by the microcomputer 2. The microcomputer 2 is provided with a serial port so as to control other ICs using the serial port. In place of the serial port, a parallel port can be used. However, a parallel port requires many external terminals for communication, so it is realistically unsuitable.

A serial port is generally provided with a clock terminal and a data terminal synchronized with the clock terminal. Among them, an I$^2$C bus is commonly used in many ICs and highly versatile. The following explanation will be directed to a case in which an I$^2$C bus is used. A plurality of slave ICs can be connected to the I$^2$C bus, and a master IC specifies the individually determined addresses of the slave ICs and communicates with the slave ICs to freely control the slave ICs.

The detailed specification of the I$^2$C bus is a common matter and the details are disclosed in, e.g., home pages of Philips Corporations, so the explanation will be omitted here. Two signals used in the I$^2$C bus are a serial clock signal (SCK) and a serial data signal (SDA). The serial clock signal (SCK) is applied from a terminal 104 and the serial data (SDA) is applied from a terminal 105. To initiate the communication, a master IC needs to specify an address of a slave IC to be selected by the communication. In this embodiment, the master IC corresponds to the microcomputer 2 and the slave IC corresponds to the motor control circuit 1.

The motor control circuit 1 includes two built-in driver circuits, i.e., a first driver circuit 7 which drives the first motor 3 and a second driver circuit 8 which drives the second motor 4. To control these two driver circuits 7 and 8 independently with a single I$^2$C bus, there is no need to prepare two unique addresses assigned to each motor driver circuit. It is sufficient to prepare one unique address.

To set a unique address, in this embodiment, three address terminals, i.e., a terminal 106, a terminal 107, and a terminal 108, are provided, so that the lower three bits of seven bits of the unique address values assigned to the slave ICs setting with common I$^2$C bus can be set from outside depending on the condition of the terminals. In this structure, up to eight ICs can be connected to the same I$^2$C bus by changing the lower three bits. In cases where only one IC is connected or an external terminal cannot be used, it can be configured to refer to ROM data using an internal ROM.

Figure 2:
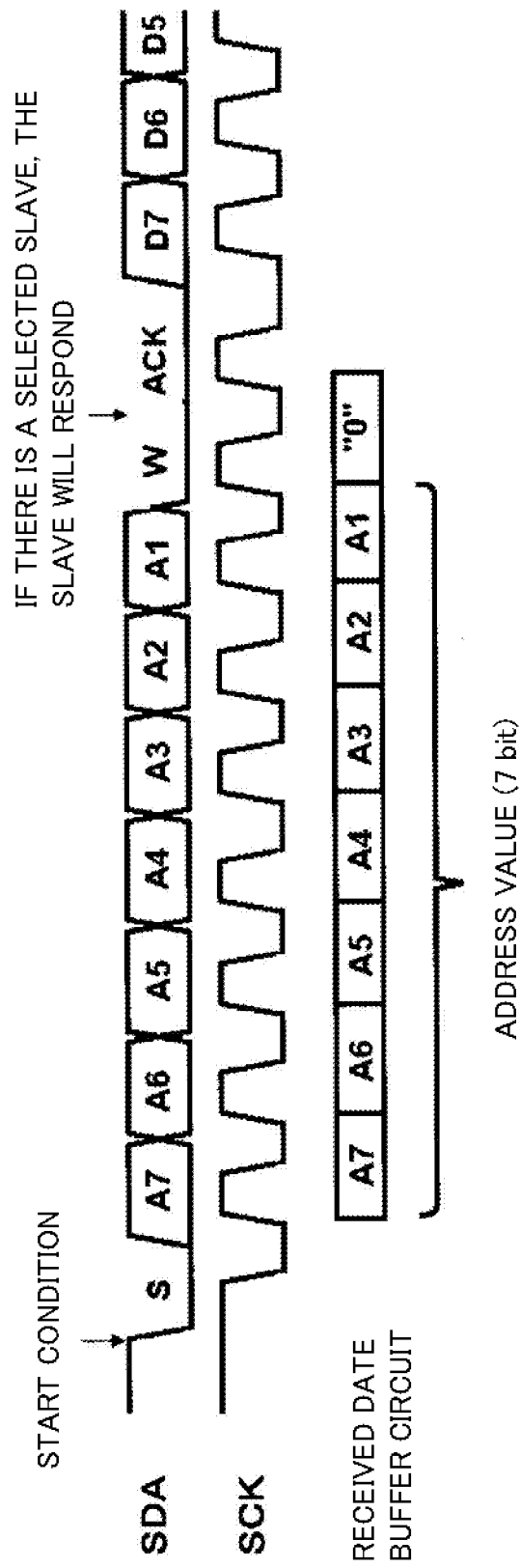
FIG. 2 is a timing chart showing the outline of the serial communication processing according to the embodiment.

As shown in FIG. 2, after a start condition is transmitted from the microcomputer 2 to initiate the communication with the I$^2$C bus, a unique address value (7 bits) assigned to the slave IC is outputted in synchronization with the clock signal. The I$^2$C bus control circuit 12 in the interface circuit 11 sends data (address) sent after the start condition to a received data buffer circuit 13. The received data buffer circuit 13 sends the stored data (address) to the address matching detection circuit 14.

The address matching detection circuit 14 previously stores an address value therein. When it is confirmed that the transmitted data (address value) are address values indicating the first motor 3 and the second motor 4, the data from the microcomputer 2 are sequentially allowed to be transmitted, which makes it possible to communicate with the motor control circuit 1.

The address matching detection circuit 14 can be configured to have two addresses, i.e., an address value of the first motor 3 and an address value of the second motor 4, so that it can detect the address matching of the first motor 3 and the second motor 4 individually, but not limited to it. That is, the address matching detection circuit 14 is not always required to have two addresses, and can be configured to have only one address in which the first half 24 bits are assigned to the first motor 3 and the remaining half 24 bits are assigned to the second motor 4 among the memory showing the one address.

With this structure, there is no need to set a unique address to each of the motor driver circuits 7 and 8, and a single address can be set as an IC. Even in cases where there is a plurality of driver circuits, it is sufficient to prepare only one I²C bus address, which enables effective use of the address even if there is a limitation on the number of addresses for IC identification.

Conventionally, in the case of using two motor drivers, separate ICs are used, which naturally requires separate settings and therefore two addresses are required. In contract, in this embodiment, even in cases where the number of built-in motor drivers is increased, it is possible to cope with the increased number of built-in motor drivers by merely increasing the capacity of the register, which enables communication with a plurality of motors only using the address terminal of a single I²C bus. For example, even if there are eight ICs each having four motor drivers, it is not required to prepare 32 addresses, and it is sufficient to prepare the same number of addresses as the number of ICs.

In this embodiment, after the completion of communication for setting values of the two motor drivers, the microcomputer 2 sends a stop condition for terminating the data forwarding to the motor control circuit 1, and the settings for the first motor 3 and the second motor 4 are finished. During the data transfer, the received data buffer circuit 13 writes the received data into the received data storage register circuit 15 by 8-bit unit.

Each of the received data buffer circuit 13 and the received data storage register circuit 15 can be a register (memory device) constituted by a flip-flop. The received data buffer circuit 13 and the received data storage register circuit 15 can be a memory, such as, e.g., a SRAM or a DRAM. In this case, however, the address management is required, which increases the IC chip area and complicates the system design. In contrast, in the case of a register, it stores data in a predetermined order, so no address management is required, which enables effective storage of required information.

Generally, significant changes of operating environments of a motor during the operation may cause troubles of the motor, and therefore the most recent setting values written in the received data storage register circuit 15 are not immediately reflected in the operating environments of the motors.

The most recent setting values of the motors will be reflected in the motor operation environments through the I²C bus, after the completion of the data transfer by the stop condition by detecting the changes in the driving pulse using a driving pulse (CLK1) terminal 100 of a motor formed separately from the I²C bus clock terminal (SCK) depending on the timing of the changes. The driving pulse (CLK1) for the motor applied from the terminal 100 is eliminated in pointed noises with a first shaping noise elimination circuit 20 and is applied to both the first rising detection circuit 24 and the first delay circuit 28.

The first raising detection circuit 24 detects changes in the driving pulse (CLK1) from the idle state. The first raising detection circuit 24 has a comparator and a counter therein, and is configured to determine that the motor is in an idle mode when there is no change in the driving pulse (CLK1) for a certain period, and thereafter notify the changes in the driving pulse, which is an input signal, to a first motor mode setting holding circuit 16 when it detects the changes. To the first motor mode setting holding circuit 16, in response to the signal from the first raising detection circuit 24, data stored in the received data storage register circuit 15 is directly transferred.

The first delay circuit 28 is configured to delay the driving pulse (CLK1). The first delay circuit 28 can be constituted by a basic delay circuit formed by combining a plurality of buffers since no significant delay such as one cycle delay or the like is required. A shift register can be used to cause further delay of the driving pulse (CLK1) when ample time is desired. While the driving pulse (CLK1) is delayed by the first delay circuit 28, the setting value of the first motor mode setting holding circuit 16 is reflected in the motor operating environments formed in the first driver circuit 7 for actually controlling the motor.

Figure 3:
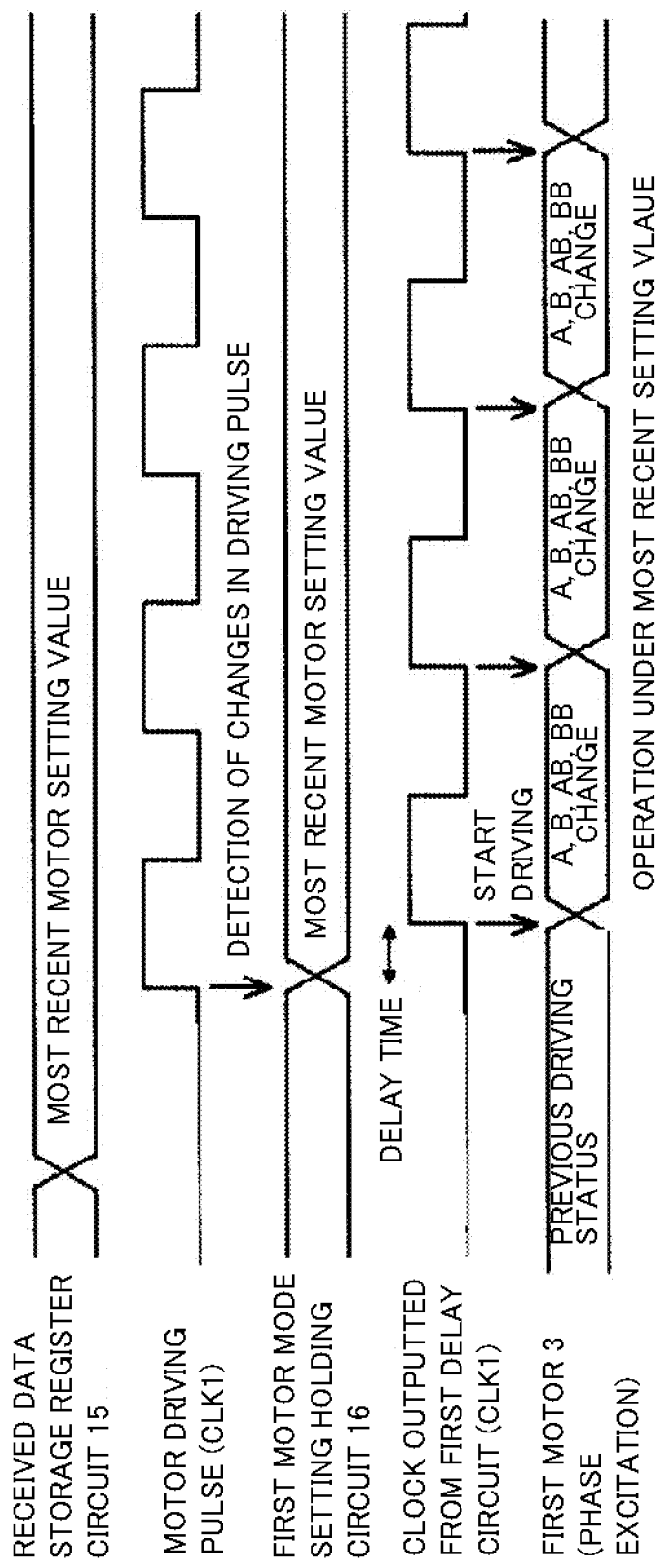
FIG. 3 is a timing chart at the time of updating the setting value of the motor according to the embodiment.

FIG. 3 shows a detailed timing chart in which the most recent setting value is reflected by the raising change of the motor driving pulse (CLK1) after the stop condition through the aforementioned I²C bus. First, the most recent motor setting value is stored in the received data storage register circuit 15. Next, the raising changes of the motor driving pulse (CLK1) and the motor driving pulse (CLK2) are detected, and the most recent setting values stored in the received data storage register circuit 15 are written in the first motor mode setting holding circuit 16 and the second motor mode setting holding circuit 17 at the timing.

At that time, even if the most recent data is stored in the received data storage register circuit 15 after the stop condition, the operation reflecting the most recent setting value is not performed immediately. In the case of communication using a serial port, data are transmitted serially, and therefore the most recent setting value is not completed in a short period of time. It cannot always be updated at a definite timing since it takes time.

Under the circumstances, in order to set a timing reflecting the most recent setting value, the driving pulse (CLK1) is used. The driving pulse (CLK1) is set to an L level (idle state) for a certain period of time, and the most recent motor setting value will be reflected at the timing (restart timing) when the operation is initiated.

With this processing, the timing for reflecting the most recent setting value in the first motor 3 can be made clear. However, the driving pulse (CLK1) relates directly to the motor revolutions, and therefore, the contents of the first motor mode setting holding circuit 16 is switched, making it difficult to control the revolutions promptly. Therefore, a slight time difference is needed. To create the slight time difference, the first delay circuit 28 is required.

The point of the operation resides in that the most recent setting value is stored in the received data storage register circuit 15 using a serial port which relatively takes time and the timing for updating the setting value to the most recent setting value is decided utilizing a certain idle period of time of the driving pulse.

With the aforementioned procedure, it is possible to freely control the timing for updating the setting value of the first motor 3 to the most recent setting value from the microcomputer 2. The motor does not always change from an idle state to a rotating state. It is common to change the setting value while the motor is rotating. If the setting value of the counter is changed during the operation, malfunction may occur, which may cause discontinuous motor operation. For this reason, the driving pulse is made to a stopped state for a certain period of time, and it is the safest timing for a motor to update the setting value at a timing of initiating the next operation.

The received data storage register circuit 15 requires a storage capacity for the bit number required to control the motors. About 48 bits is the number of bits required to control the first motor 3 and the second motor 4. When the received data buffer circuit 13 transmitted data to the received data storage register circuit 15 six times if the data is 8-bit, the received data storage register circuit 15 will be filled with the data. In other words, after transmitting the data six times through the I²C bus, it is necessary to transmit the stop condition to complete the data.

Furthermore, it is preferable that the received data storage register circuit 15 has a bit count which is the same as a total of the bit count of the first motor mode setting holding circuit 16 and that of the second motor mode setting holding circuit 17. If the bit count is the same as the total number of bit counts as mentioned above, it is not required to intervene an address decoder or the like, and thus, the structure can be simplified since it only requires direct forwarding to the same bit position.

Figure 4:
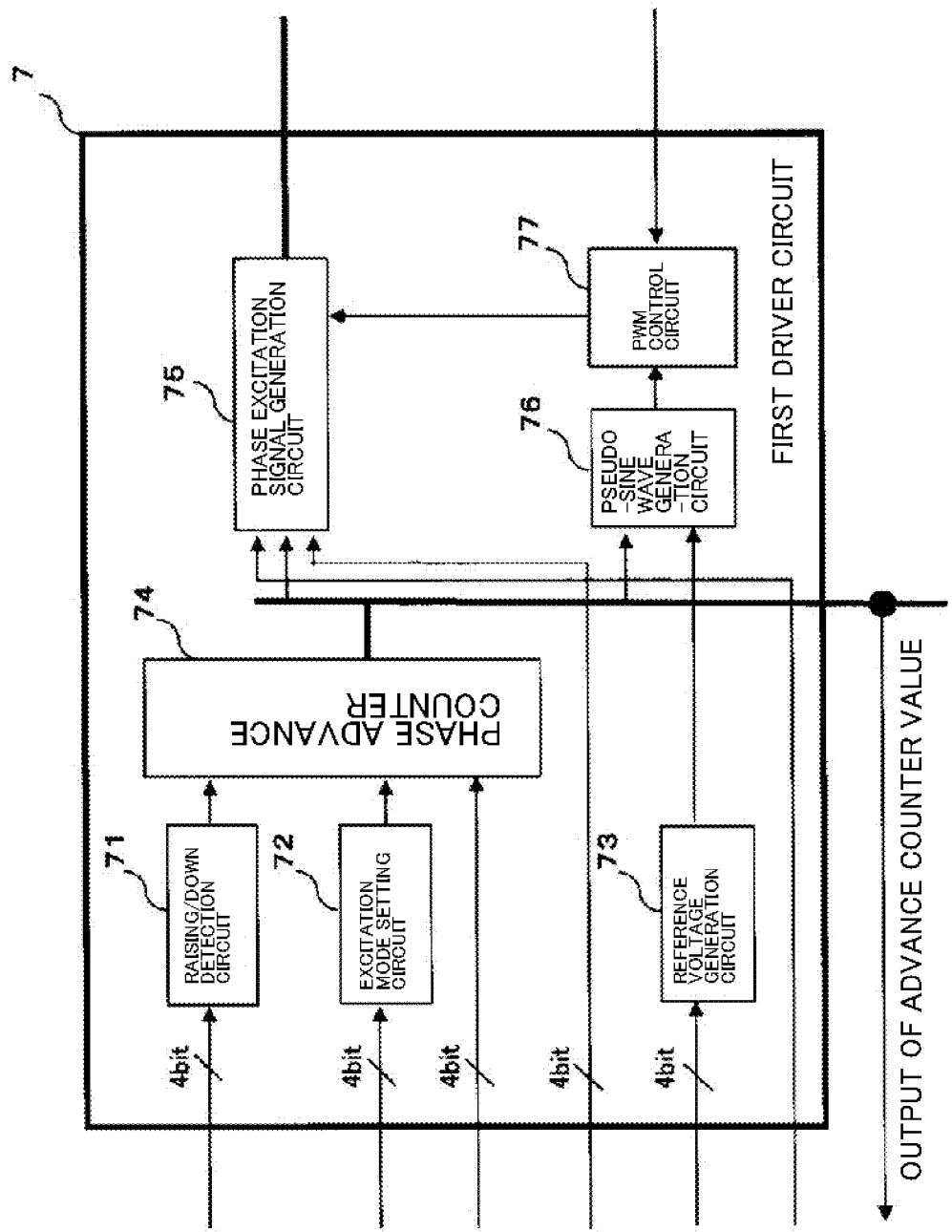
FIG. 4 is a block diagram showing a structure of a first driver circuit according to the embodiment.

FIG. 4 shows an inside of a block diagram of the first driver circuit 7. The second driver circuit 8 has the same structure as that of the first driver circuit 7, and therefore the cumulative explanation will be omitted here. The first driver circuit 7 includes: a raising/down detection circuit 71 for detecting the raising/down of a clock signal for controlling the motor; an excitation mode setting circuit 72 for setting each excitation mode of motors; a reference voltage generation circuit 73 for generating a reference voltage to determine the electric current of the motor; a phase advance counter 74 that operates according to the detection results from the raising/down detection circuit 71 and the setting signal from the excitation mode setting circuit 72; a phase excitation signal generation circuit 75 for performing the switching control for transistors 50, 51, 52 and 53 which actually controls the first motor 3; and a pseudo-sine wave generation circuit 76 that receives signals from the reference voltage generation circuit 73 and the phase advance counter 74 to generate a pseudo-sine wave; and a PWM control circuit 77 that receives a sine wave from the pseudo-sine wave generation circuit 76 to generate a PWM waveform according to the sine wave.

In the first motor mode setting holding circuit 16, in order, the first 4 bits ($1^{st}$ bit to $4^{th}$ bit) are used for setting the raising/down detection circuit 71, the next 4 bits ($5^{th}$ bit to $8^{th}$ bit) are used for setting the excitation mode setting circuit 72, the next 4 bits ($9^{th}$ bit to $12^{th}$ bit) are used for setting the phase advance counter 74, the next 4 bits ($13^{th}$ bit to $16^{th}$ bit) are used for setting the phase excitation signal generation circuit 75, and the next 4 bits ($17^{th}$ bit to $20^{th}$ bit) are used for setting the reference voltage generation circuit 73. The order of each bit can be matched to the operating environments of the first driver circuit. In the phase excitation generation circuit 75, signals required for the excitation mode is generated using the count value from the phase advance counter 74. By these series of settings, the motor control circuit 1 outputs the signals to the two-phase driving terminals φ1 (A), φ2 (AB), φ3 (B), and φ4 (BB) of the first motor 3.

Figure 5:
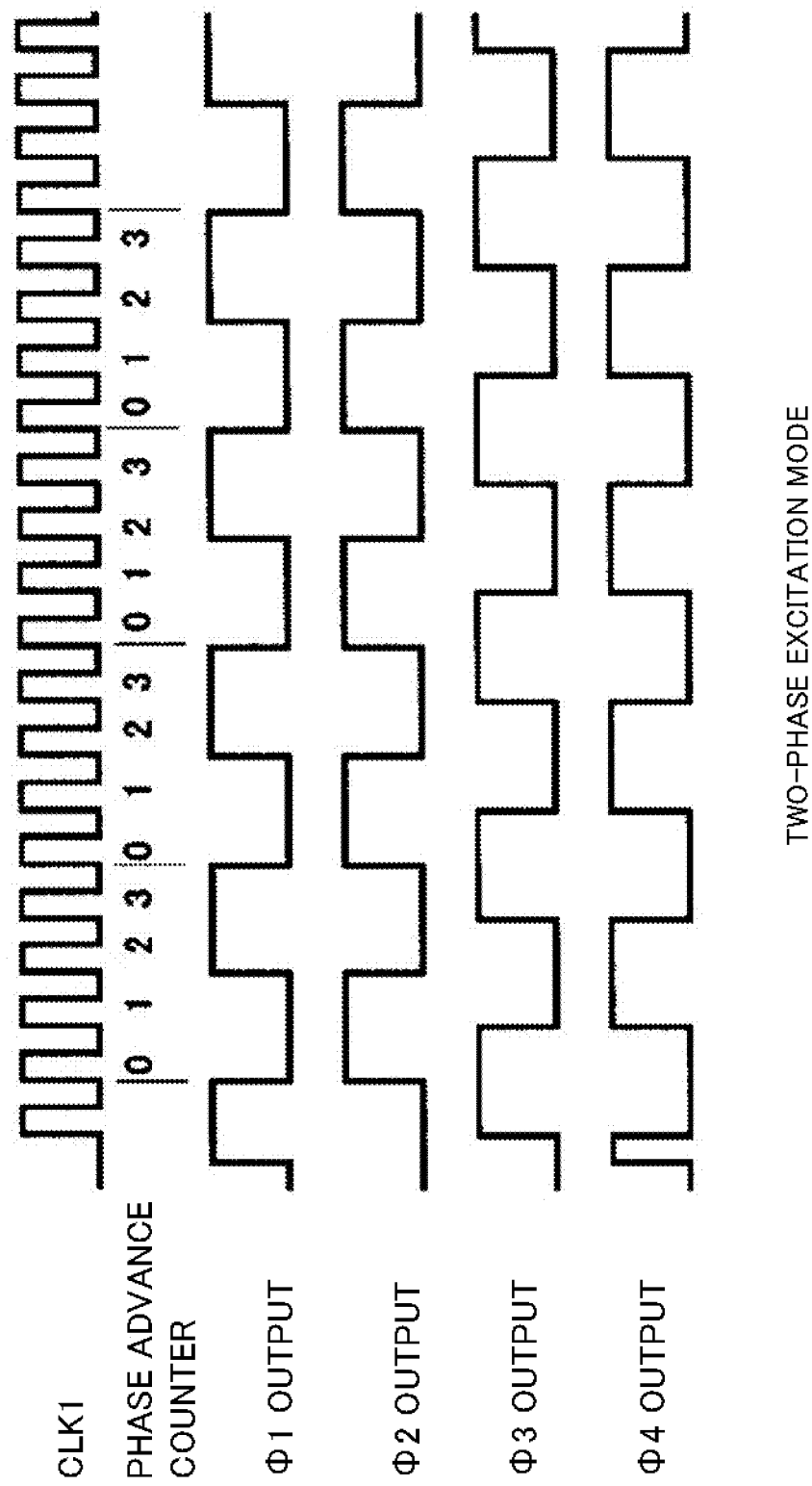
FIG. 5 is a timing chart in a two-phase excitation mode according to the embodiment.
Figure 6:
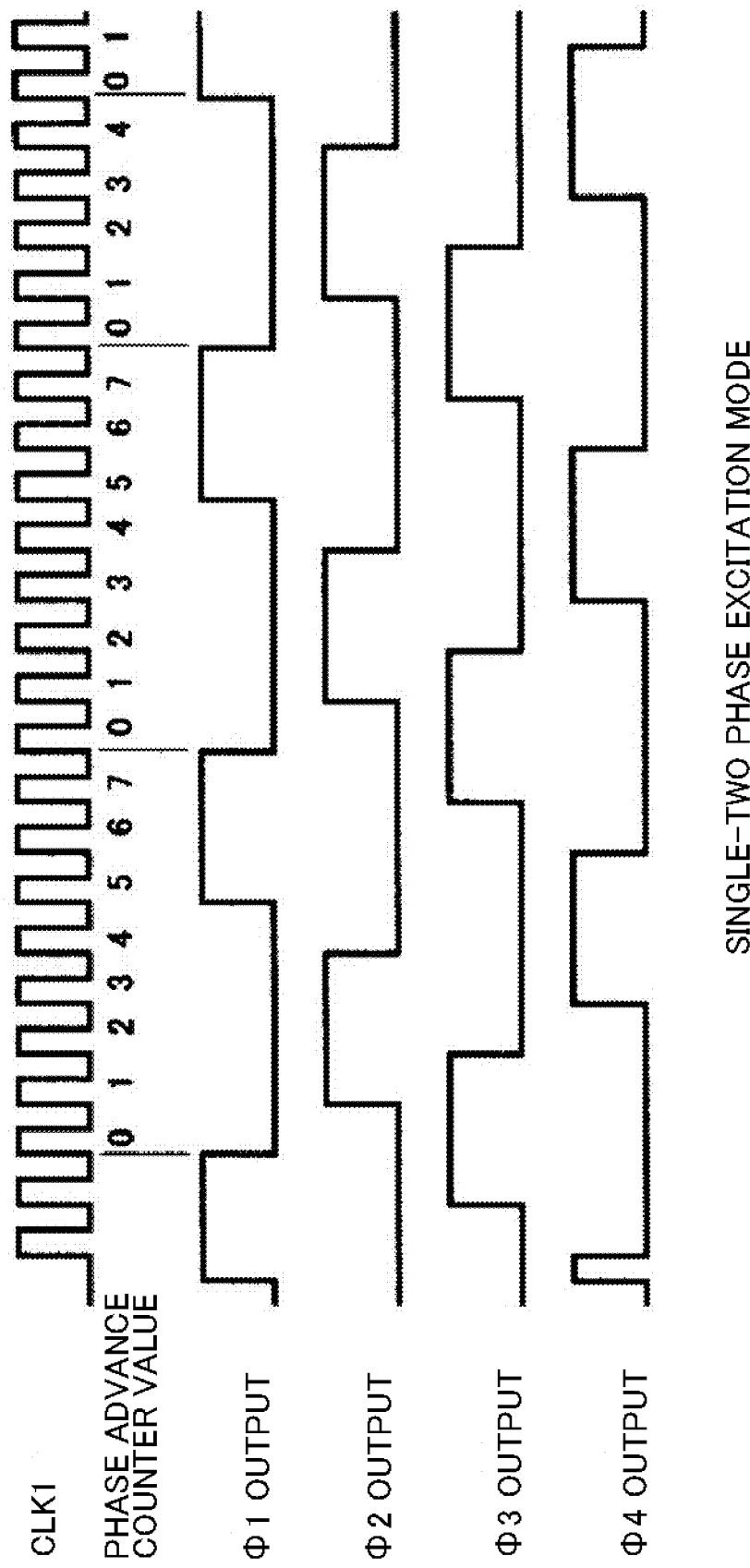
FIG. 6 is a timing chart in a single-two phase excitation mode according to the embodiment.

As a specific output example, FIG. 5 shows a timing chart of the two-phase excitation mode and FIG. 6 shows a timing chart of a single-two phase excitation mode. By the phase advance counter value from the phase excitation generation circuit 75, various motor excitation modes can be set arbitrarily.

In the aforementioned embodiment, the explanation was directed to the case in which two-phase stepping motors are used. However, even in the case of a three-phase or a five-phase motor, the basic circuit structure is essentially the same as in the aforementioned embodiment except for the increased control transistors.

In FIG. 1, the reference numeral 81 denotes a current-voltage conversion circuit (I-V conversion circuit) which converts the electric current flowing through the first motor 3 into a voltage and outputs the voltage to the PWM control circuit 77 of the first driver circuit 7. Similarly, the reference numeral 82 denotes a current-voltage conversion circuit ("I-V conversion circuit") which converts the electric current flowing through the second motor 4 into a voltage and outputs the voltage to the PWM control circuit 77 of the second driver circuit 8.

The second motor 4 is controlled in the same manner as in the first motor 3 as mentioned above, and therefore the detail explanation will be omitted.

Figure 7:
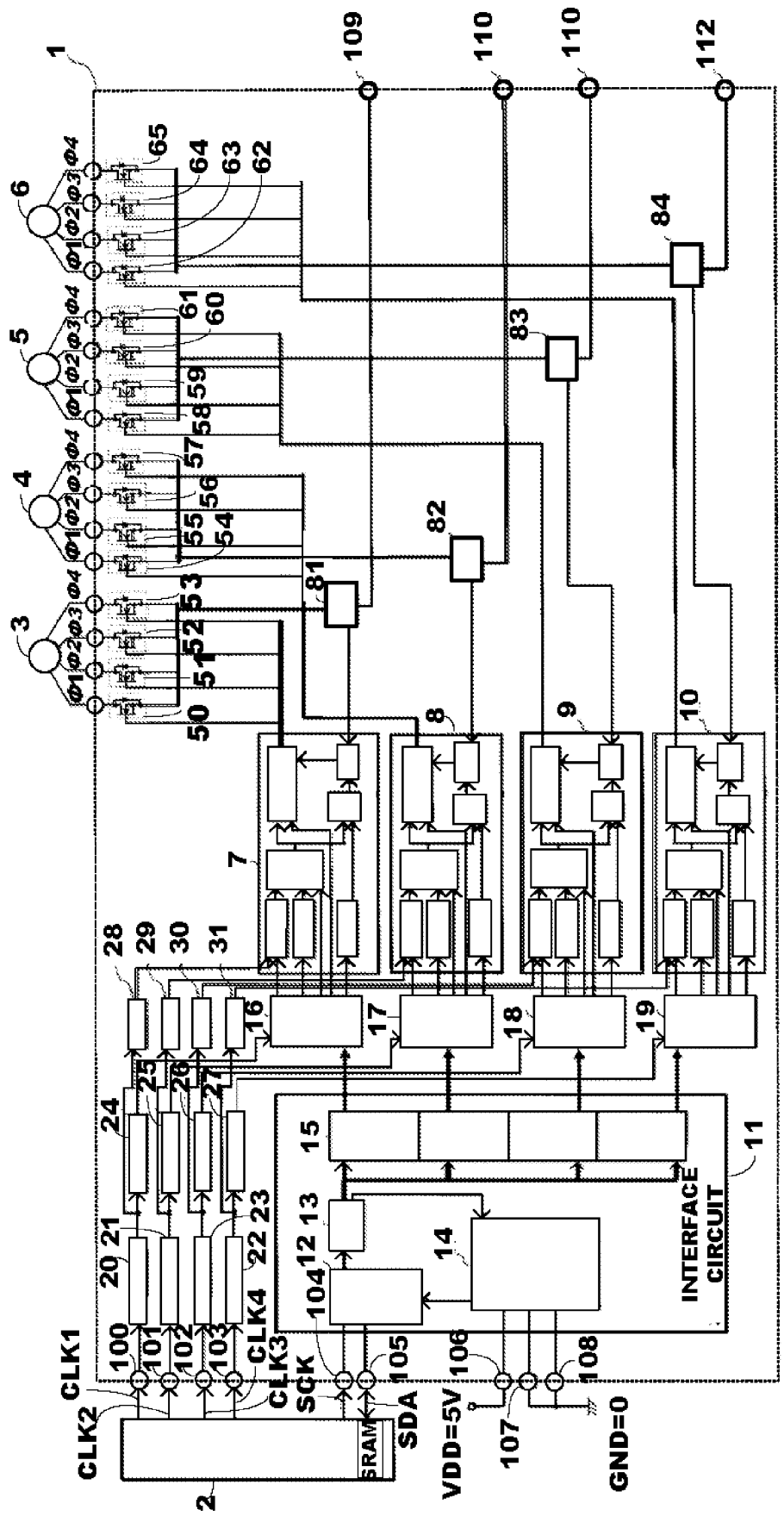
FIG. 7 is a block diagram showing a structure of a motor control circuit according to another embodiment of the present invention.

In the aforementioned embodiments, the motor driver circuit 1 shown in FIG. 1 includes two driver circuits 7 and 8, but the present invention can also be applied to the case having three or four built-in driver circuits in the same manner as mentioned above. FIG. 7 shows the case in which four motor driver circuits 7, 8, 9, and 10 are provided. Even in the case where four motor driver circuits are provided, it is sufficient to prepare a single unique address value in the address matching detection circuit. Since the operation of the case is essentially the same as in the first embodiment, the detail explanation will be omitted by allotting the same and corresponding reference numerals.

Figure 8:
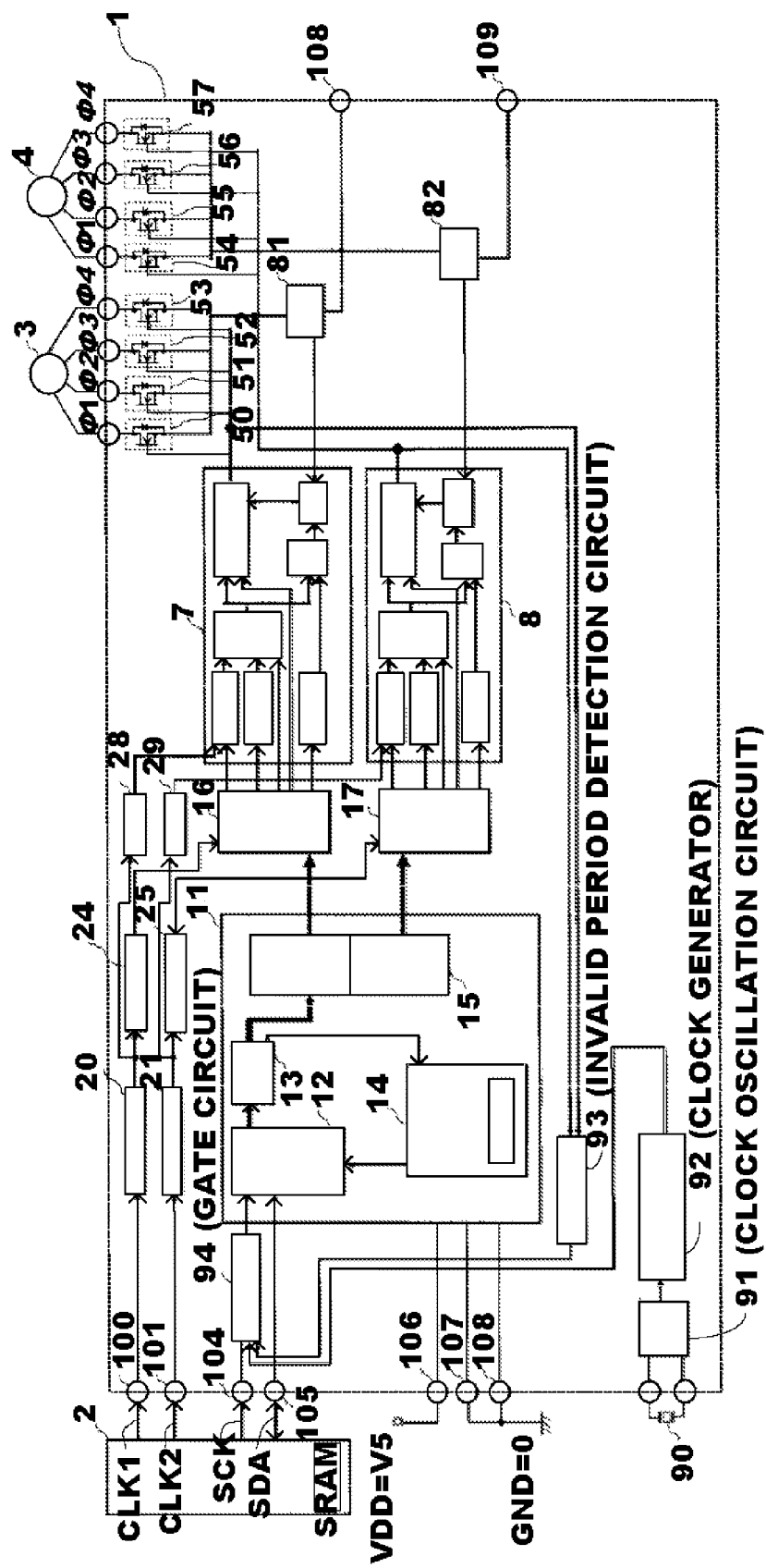
FIG. 8 is a block diagram showing a structure of a motor control circuit according to a second embodiment of the present invention.
Figure 9:
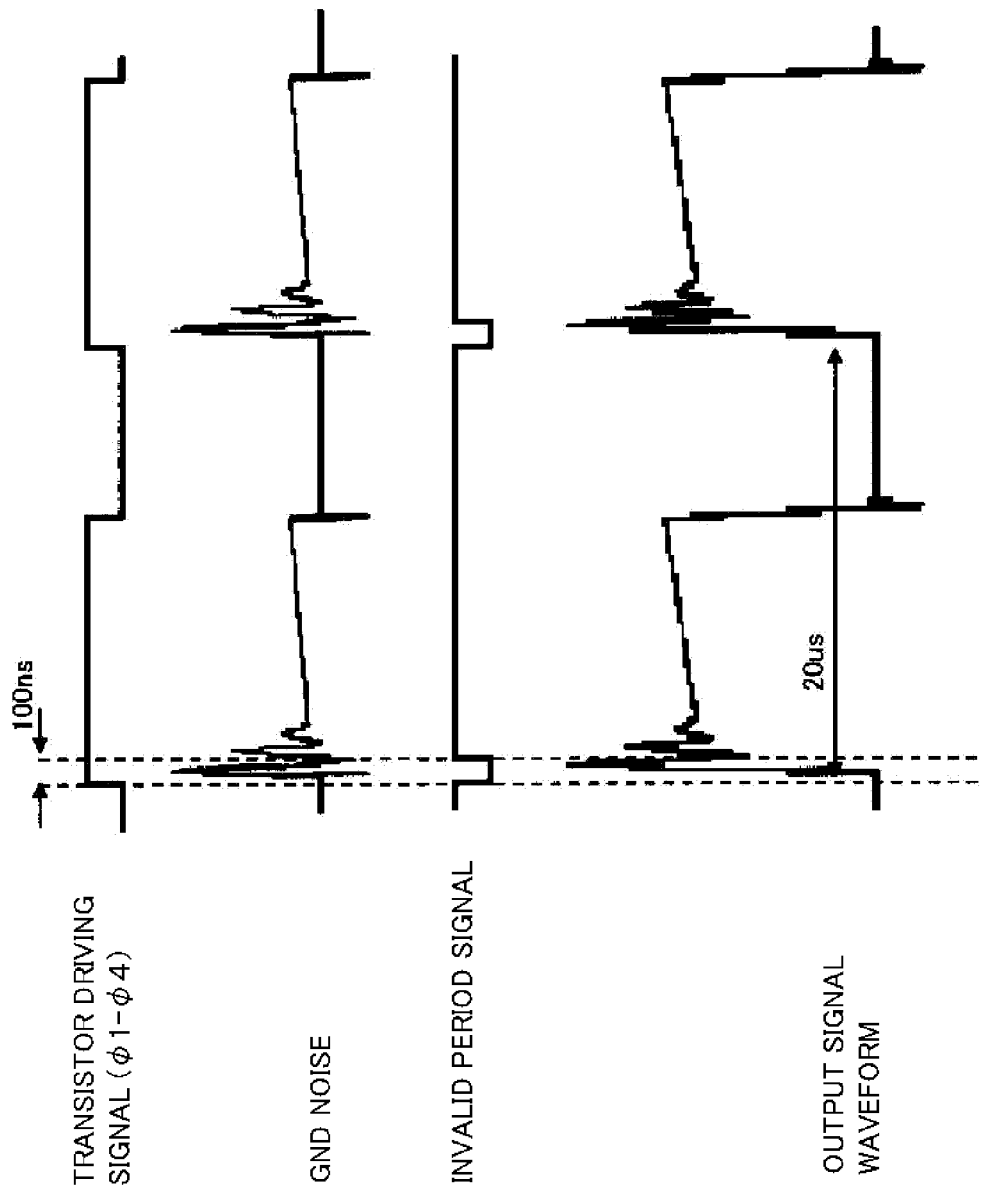
FIG. 9 is a timing chart showing a GND noise according to the embodiment.

FIG. 8 shows a block diagram showing a motor control circuit 1 for controlling two motors, i.e., a first motor 3 and a second motor 4, according to a second embodiment of the present invention. This motor control circuit 1 of this second embodiment is generally the same as that of the first embodiment, and therefore the cumulative explanation will be omitted by allotting the same reference numeral to the corresponding portion. The following explanation will be directed to the structure different from that of the first embodiment.

When the motor control circuit 1 receives the setting values from the microcomputer 2 using the signal lines of the $I^2C$ bus, there is a possibility that the timing coincides with the large current change timing of the first motor 3 and the second motor 4. At that time, a large current flows through the motors at the time of the driving, causing presence of noise on the ground line of the motor control circuit 1, which may affect the operation of the entire IC. This may also affects the signal lines of the $I^2C$ bus. As a result, the new setting value from the microcomputer 2 is affected by the noise, which may cause false setting. Such false setting may cause false driving of the motor, resulting in damage of the motor and/or IC.

At the timing when the transistor driving signals φ1-φ4 change when the transistors 50-57 for controlling the driving of the first motor 3 and the second motor 4 turn on and off, GND noise may appear during the period of 100 ns. Such noise affects the inside of the IC. As shown in the output signal waveform, the GND noise affects the signal waveform. Naturally, during the GND noise period, the signal set by the microcomputer 2 via the signal lines of the $I^2C$ bus deteriorates in reliability.

Therefore, during the period in which the GND noise appears, an invalid period signal is generated for a short period of time from the raising timing of the transistor driving signal φ1-φ4 so as not to receive the signal set by the microcomputer 2. This invalid period signal is created by an invalid period detection circuit 93. This invalid period detection circuit 93 detects the raising of the signal from the phase excitation signal generation circuits provided in the first driver circuit 7 and the second driver circuit 8 and creates a signal which becomes active during a certain period of time during which the GND noise appears. The aforementioned certain period of time can be created by a counter or a delay circuit.

Figure 10:
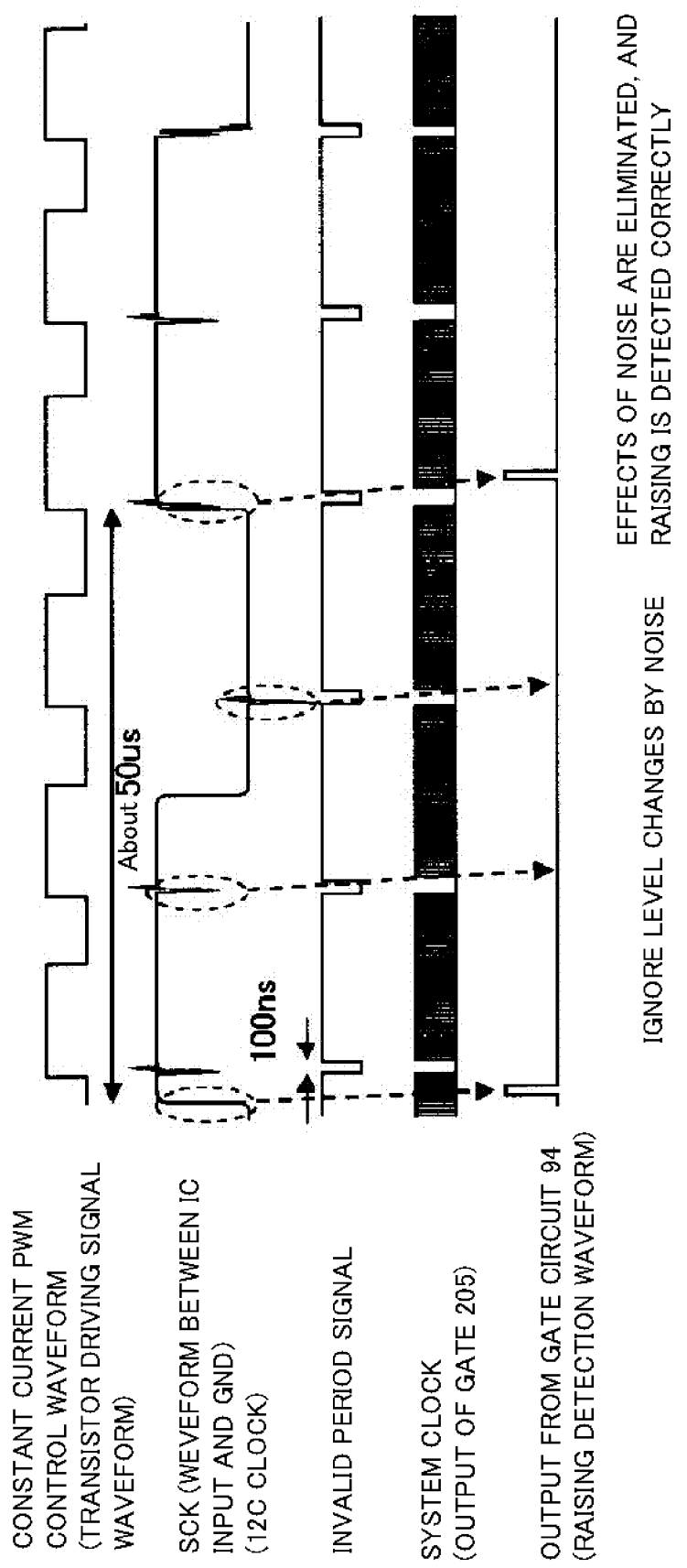
FIG. 10 is a timing chart showing the relationship between an invalid period signal and another signals according to the embodiment.

FIG. 10 shows a motor constant current controlling transistor driving signal (gate driving waveform) created based on the clock signal CLK1 used for controlling the motor, the serial clock signal SCK of the $I^2C$ bus, the invalid period signal, the system clock signal, and the output from the gate circuit 94. Even if the system clock signal is stopped by the invalid period signal to stop the sampling, it is possible to remove only noise from the output from the gate circuit 94 as shown in FIG. 10. In this case, there is a condition that the sampling clock frequency is high to some degree and that the invalid period signal does not continue for a long period of time. However, the effects of the GND noise can be ignored, and the signal set by the microcomputer 2 via the signal lines of the I²C bus can be greatly improved in reliability.

Figure 11:
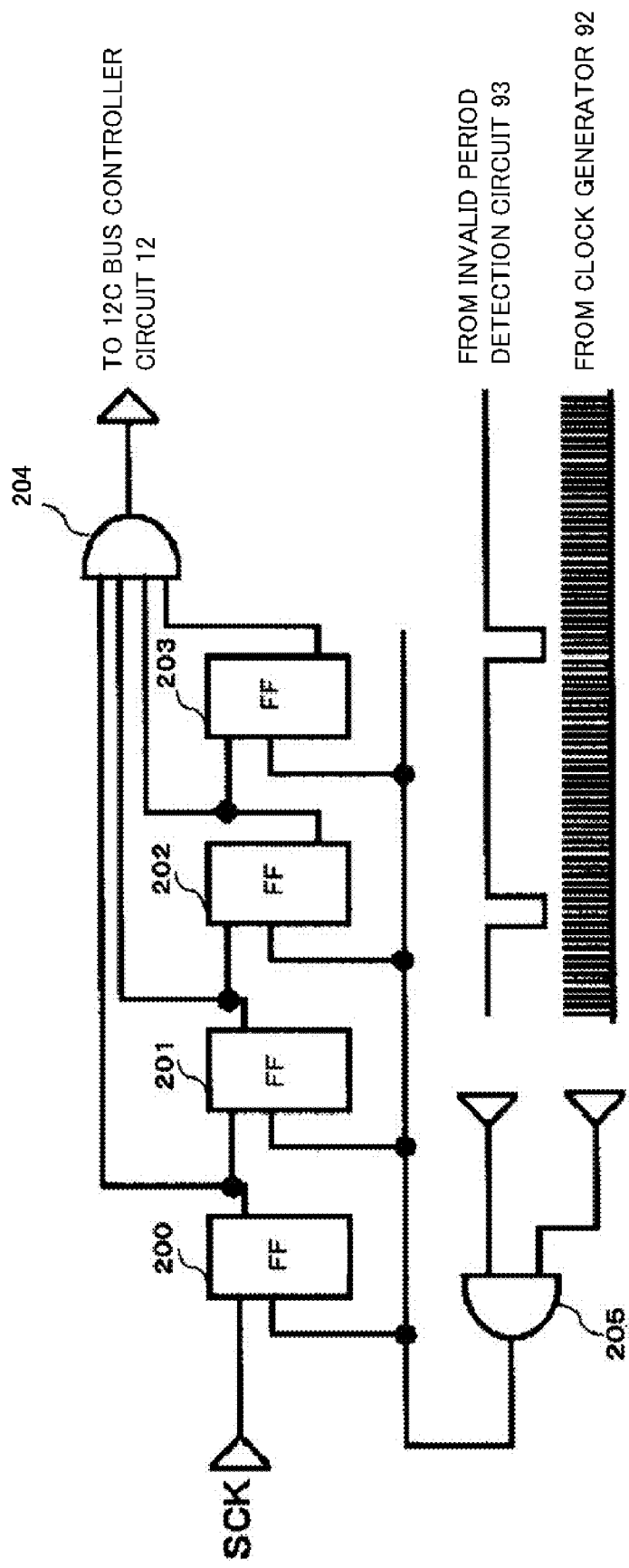
FIG. 11 is a block diagram showing the detail of a gate circuit according to the embodiment.

FIG. 11 shows the detail of the inside of the gate circuit 94 which is an example of four-stage raising detection circuit. The gate circuit 94 is provided at the side of the clock terminal SCK among the I²C bus affected.

The output from the clock generator 92 will be an output from a frequency dividing (clock generator 92) for changing the frequency dividing ratio of the signal from the clock oscillation circuit 91 which receives the signal from the crystal oscillator 90 and create a rectangular wave. The clock signal to be outputted from the clock generator 92 is widely used within the IC as a system clock signal used for the timing of latch circuits, flip-flops, etc.

Inputted to the gate circuit 94 are three signals, i.e., a bus clock signal SCK of the I²C bus, a system clock signal from the clock generator 92, and an invalid period signal from the invalid period detection circuit. The bus clock signal SCK is applied to the data terminal of the four flip-flops connected in series. To the clock terminals of the flip-flops, a gate clock signal obtained by gating the system clock signal by the invalid period signal is applied.

With the aforementioned structure, even if the GND nose appears on the bus clock signal SCK, the effects by the GND noise can be prevented using the four-stage flip-flops and the gate clock signal in which the GND noise period is avoided. Even if a system clock signal is blocked for a certain period of time considering the GND noise, there is no effect on the system because of the following reasons.

A system clock signal is generally about 10 MHz or above in frequency. On the other hand, the crystal oscillator 90 uses an oscillator which is approximately 20 MHz or above in frequency which will be divided by two into a system clock signal. In some cases, a clock signal SCK of an I²C may be high in frequency. In general, however, a clock signal is about 1 MHz in frequency. Therefore, even if no sampling of the bus clock signal is performed for the period in which the GND noise appears, e.g., one cycle, even in cases where the bus clock signal SCK is changed at the timing in which the GND noise disappears, no problem will occur in the subsequent processing since the system clock signal is high in frequency.

In the embodiment shown in FIG. 11, the raising detection circuit is constituted by four flip-flops connected in series. In place of this, the raising detection circuit can be constituted by a single flip-flop or two flip-flop connected in series. In any event, such raising detection circuit should be inserted at the initial stage of the input circuit which corresponds to the inlet of a signal because noise is caused by the instantaneous level fluctuations between the GND line of the output circuit for sending the bus clock signal SCK and the GND line of the input circuit block of the IC. Otherwise, if noise is once introduced into the IC, double or triple special countermeasures should be taken to prevent false operations in the subsequent stages.

In this second embodiment, the motor driver circuit 1 shown in FIG. 8 includes two driver circuits 7 and 8, but the present invention can also be applied to the case having three or four built-in driver circuits as shown in FIG. 7 in the same manner as in the first embodiment. Even in the case where four motor driver circuits are provided, it is sufficient to prepare a single unique address value in the address matching detection circuit. Since the operation of the case is essentially the same as in the first embodiment, the detail explanation will be omitted by allotting the same or corresponding reference numeral.

As described above, according to the present invention, even if the number of motor driver circuits increases, it is possible to cope with the increased number of motor driver circuits by simply increasing the capacity of the register, eliminating the necessity of providing new external terminals, which realizes an effective motor control.

BROAD SCOPE OF THE INVENTION

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein. While illustrative embodiments of the invention have been described herein, the present invention is not limited to the various preferred embodiments described herein, but includes any and all embodiments having equivalent air filter elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" is meant as a non-specific, general reference and may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example."

What is claimed is:
1. A motor control circuit for controlling driving of a plurality of motors, comprising:
    a serial communication circuit configured to perform serial communication with an outer processor;
    a storage configured to store data from the serial communication circuit;

a motor mode setting holding circuit configured to store motor mode settings which decide operations of the motors;

a detection circuit configured to detect changes in driving pulse of the motor, wherein, depending on the detected result of the detection circuit, the data stored in the storage is transferred to the motor mode setting holding circuit, and an address matching detection circuit, wherein the address matching detection circuit has a storage portion and a comparison portion, and the storage portion stores a unique address, and wherein the comparison portion compares the unique address with an address sent from the serial communication circuit, and allows communication through the serial communication circuit when the address sent from the serial communication circuit coincides with the unique address.

2. The motor control circuit of claim 1, wherein the storage has the same capacity as a capacity of the motor mode setting holding circuit.

3. A motor control circuit for controlling driving of a plurality of motors, comprising:

a serial communication circuit configured to perform serial communication with an outer processor;

an address matching detection circuit, wherein the address matching detection circuit has a storage portion and a comparison portion, and the storage portion stores a unique address, and wherein the comparison portion compares the unique address with an address sent from the serial communication circuit, and allows communication through the serial communication circuit in response to the address sent from the serial communication circuit coinciding with the unique address;

a storage configured to store data from the serial communication circuit;

a motor mode setting holding circuit configured to store motor mode settings which decide operations of the motors;

a detection circuit configured to detect changes in driving pulse of the motor, wherein, depending on the detected result of the detection circuit, the data stored in the storage is transferred to the motor mode setting holding circuit, and a delay circuit for delaying the driving pulse of the motor, wherein, during the delayed period of time caused by the delay circuit, the data stored in the storage is transferred to the motor mode setting holding circuit so as to reflect the data in operation setting of the motor.

4. The motor control circuit of claim 3, wherein the storage has the same capacity as a capacity of the motor mode setting holding circuit.

5. The motor control circuit of claim 3, further including a first driver circuit having a first input coupled to the delay circuit.

6. The motor control circuit for controlling driving of a plurality of motors of claim 3, further including:

another motor mode setting holding circuit configured to store motor mode settings which decide operations of the motors;

another detection circuit configured to detect changes in driving pulse of the motor, wherein, depending on the detected result of the another detection circuit, the data stored in the storage is transferred to the another motor mode setting holding circuit; and another delay circuit for delaying the driving pulse of the motor, wherein, during the delayed period of time caused by the another delay circuit, the data stored in the storage is transferred to the another motor mode setting holding circuit so as to reflect the data in operation setting of the motor.

7. The motor control circuit of claim 6, further including:

a first driver circuit having a first input coupled to the delay circuit; and a second driver circuit having a first input coupled to another delay circuit.

\* \* \* \* \*